United States Patent [19]

Kohda

[11] Patent Number: 5,021,671

[45] Date of Patent: Jun. 4, 1991

[54] RADIATION IMAGE STORAGE PANEL

[75] Inventor: Katsuhiro Kohda, Kaisei, Japan

[73] Assignee: Fuji Photo Film Co., Ltd., Minami-ashigara, Japan

[21] Appl. No.: 441,892

[22] Filed: Nov. 27, 1989

[30] Foreign Application Priority Data

Nov. 25, 1988 [JP] Japan .................. 63-298593

[51] Int. Cl.$^5$ .................. G03B 42/08; G01T 1/00
[52] U.S. Cl. .................. 250/484.1; 250/327.2
[58] Field of Search .................. 250/484.1 B, 327.2

[56] References Cited

U.S. PATENT DOCUMENTS

| | | | |
|---|---|---|---|
| 4,239,968 | 12/1980 | Kotera et al. | 250/327.2 |
| 4,501,683 | 2/1985 | Arakawa et al. | 252/301.26 |
| 4,603,260 | 7/1986 | Takano | 250/484.1 |
| 4,728,583 | 3/1988 | Yamazaki et al. | 428/690 |
| 4,733,090 | 3/1988 | Deboer et al. | 250/484.1 |
| 4,845,369 | 7/1990 | Arakawa et al. | 250/484.1 |
| 4,896,043 | 1/1990 | Arakawa et al. | 250/484.1 |

*Primary Examiner*—Constantine Hannaher
*Assistant Examiner*—Edward J. Glick
*Attorney, Agent, or Firm*—Sixbey, Friedman, Leedom & Ferguson, Jr.

[57] ABSTRACT

Disclosed is a radiation image storage panel having a phosphor layer comprising a stimulable phosphor and a protective film provided on the phosphor layer via an adhesive layer, wherein at least one of the protective film, the adhesive layer and the phosphor layer contains an ultraviolet light absorbing agent. Also disclosed is a radiation image storage panel having a phosphor layer comprising a stimulable phosphor and a protective layer, wherein at least one of the protective film and the phosphor layer contains an ultraviolet light absorbing agent.

8 Claims, No Drawings

RADIATION IMAGE STORAGE PANEL

FIELD OF THE INVENTION

The present invention relates to a radiation image storage panel employable in a radiation image recording and reproducing method utilizing a stimulable phosphor.

BACKGROUND OF THE INVENTION

As a method replacing a conventional radiography, a radiation image recording and reproducing method utilizing a stimulable phosphor is described, for instance, in U.S. Pat. No. 4,239,968 and is practically used. In the method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals After the remaining radiation image is erased from the radiation image storage panel, the panel is prepared for the next radiographic process, that is, the panel is generally used repeatedly after the recorded image is erased.

In the radiation image recording and reproducing method, a radiation image is obtainable with a sufficient amount of information by applying a radiation to an object at a considerably smaller dose, as compared with the conventional radiography using a combination of a radiographic film and a radiographic intensifying screen. Further, the method is very advantageous from the viewpoints of conservation of resources and economic efficiency because the radiation image storage panel can be repeatedly used in the method, while the radiographic film is consumed for each radiographic process in the conventional radiography. The radiation image storage panel employed in the above-described method generally comprises a support and a stimulable phosphor layer provided on one surface of the support. However, if the phosphor layer is self-supporting, the support may be omitted.

As the stimulable phosphor layer, there are known not only a phosphor layer comprising a binder and a stimulable phosphor dispersed therein but also a phosphor layer composed of only an agglomerate of a stimulable phosphor, not containing a binder, which is formed through deposition process or sintering process. The present applicant has already applied for patent with respect to a radiation image storage panel having other type of a phosphor layer in which voids of a stimulable phosphor agglomerate are impregnated with a polymer material (U.S. patent application Ser. No. 184,010 now application Ser. No. 07/462,338). In any of the above-described phosphor layers, the stimulable phosphor emits light (stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photo-electrically detected to give electric signals, so as to reproduce a visible image from the electric signals.

In the case the phosphor layer is provided on a support, a film (i.e., protective film) is generally provided on the free surface (surface not facing the support) of the phosphor layer to protect the phosphor layer from chemical deterioration or physical shock.

The protective film can be formed on the phosphor layer by coating the surface of the phosphor layer with a solution prepared by dissolving an organic polymer material such as a cellulose derivative or polymethyl methacrylate in an appropriate solvent. Alternatively, the protective film can be provided on the phosphor layer by beforehand preparing an organic polymer film such as a film of polyethylene terephthalate; or a sheet for the formation of a protective film such as a transparent glass sheet, followed by placing and fixing it onto the phosphor layer with an appropriate adhesive agent. Otherwise, the protective film can be provided by depositing an inorganic compound on the phosphor layer.

The radiation image storage panel is generally handled or treated under the condition that the panel is shielded from light of outside such as sunlight or room light (namely, under the light-shielded state). The reason is as follows. The stimulable phosphor also absorbs ultraviolet rays and stores energy thereof, so that when the panel is exposed to sunlight or room light (e.g., light of fluorescent lamp), the ultraviolet rays contained in the light is absorbed by the stimulable phosphor and the energy of the ultraviolet rays is stored in the stimulable phosphor. In the reading procedure of a radiation energy-stored image by irradiating the panel with stimulating rays, stimulated emission based on thus stored ultraviolet rays-energy is simultaneously read out to cause occurrence of fogging on the resulting radiation image.

Accordingly, the radiation image storage panel should be handled or treated carefully not to expose the panel to light from outside such as sunlight or room light, and such treatment or handling is sometimes troublesome.

After the radiation image is read from the radiation image storage panel, the panel is irradiated with a light for erasing the remaining radiation image (also referred to hereinafter as "an erasing light"). If the erasing light contains ultraviolet rays, energy of the ultraviolet rays is stored by the stimulable phosphor, while the remaining radiation image is erased by the erasing light, and as a result, the radiation image obtained in the subsequent radiographic process suffers from fogging. Accordingly, it is required to select as the erasing light a light containing less ultraviolet rays, and hence, a light source of the erasing light is restricted.

For coping with the above-described problem, an apparatus for erasing a remaining radiation image of the radiation image storage panel in which the panel is irradiated with an erasing light through an ultraviolet rays-absorbing filter is proposed by Japanese Patent Provisional Publication No. 63(1988)-97939.

However, even if the radiation image storage panel is subjected to the erasing procedure using the above-mentioned specific erasing apparatus, the panel is still required to be treated under the light-shielded state until the next radiographic process.

Further, in the above-mentioned erasing apparatus, even the light useful for the erasing procedure (i.e., erasing light) is also removed (cut off) in a certain amount by the ultraviolet rays-removing filter, so that the erasing efficiency of the apparatus becomes lower than that of the conventional erasing apparatus. Hence, for conducting satisfactory erasure of the remaining radiation image using the above-described apparatus, it is required to use a light source having higher intensity than that used in the known procedures, with the result that a large sized apparatus is required and electric power is considerably consumed.

SUMMARY OF THE INVENTION

It is an object of the present invention to provide a radiation image storage panel which is free from the condition that the panel is shielded from light of outside and which does not require any special apparatus for erasing a radiation image remaining therein.

Particularly, the object of the invention is to provide a radiation image storage panel which can give a radiation image almost free from fogging caused by ultraviolet rays.

There is provided by the present invention a radiation image storage panel having a phosphor layer comprising a stimulable phosphor and a protective film provided on the phosphor layer via an adhesive layer, wherein at least one of the phosphor layer, the adhesive layer and the protective film contains an ultraviolet light absorbing agent.

There is also provided by the invention a radiation image storage panel having a phosphor layer comprising a stimulable phosphor and a protective film, wherein at least one of the phosphor layer and the protective layer contains an ultraviolet light absorbing agent.

The terms "ultraviolet light absorbing agent" used herein means a substance having a high absorption band in the ultraviolet wavelength region such as salicylates, benzophenone derivatives and benzotriazole derivatives.

In the radiation image storage panel of the invention, the ultraviolet light absorbing agent contained in the protective film, adhesive layer or the phosphor layer absorbs ultraviolet rays contained in the light from outside or the erasing light, and thereby the obtained radiation image can prevented from fogging caused by the ultraviolet rays. As a matter of course, the ultraviolet absorbing agent can be contained in any one of the above-mentioned film and layers or in two or more of the above-mentioned film and layers.

DETAILED DESCRIPTION OF THE INVENTION

The radiation image storage panel of the present invention is now described in more detail.

First of all, the stimulable phosphor constituting the phosphor layer of the radiation image storage panel is described below.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300-500 nm when excited with stimulating rays in the wavelength region of 400-900 nm.

Examples of the stimulable phosphors employable in the radiation image storage panel of the invention include:

SrS:Ce,Sm, SrS:Eu,Sm, ThO$_2$:Er, and La$_2$O$_2$S:Eu,Sm;

ZnS:Cu,Pb, BaO.xAl$_2$O$_3$:Eu, in which x is a number satisfying the condition of $0.8 \leq x \leq 10$, and M$^{II}$O.xSiO$_2$:A, in which M$^{II}$ is at least one divalent metal element selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$;

(BA$_{1-x,y}$,Mg$_x$, Ca$_y$)FX:aEu$^{2+}$, in which X is at least one element selected from the group consisting of Cl and Br, x and y are numbers satisfying the conditions of $0 < x+y \leq 0.6$ and $xy \neq 0$, and a is a number satisfying the condition of $10^{-6} \leq a \leq 5 \times 10^{-2}$;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$;

(Ba$_{1-x}$,M$^{II}$$_x$)FX:yA, in which M$^{II}$ is at least one divalent metal element selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively;

M$^{II}$FX.xA:yLn, in which M$^{II}$ is at least one element selected from the group consisting of Ba, Ca, Sr, Mg, Zn and Cd; A is at least one compound selected from the group consisting of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ and ThO$_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leq x \leq 0.5$ and $0 \leq y \leq 0.2$, respectively;

(Ba$_{1-x}$,M$^{II}$$_x$)F$_2$.aBaX$_2$:yEu,zA, in which M$^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq x \leq 1$, $10^{-6} \leq y \leq 2 \times 10^{-1}$, and $0 \leq z \leq 10^{-2}$, respectively;

(Ba$_{1-x}$,M$^{II}$$_x$)F$_2$.aBaX$_2$:yEu,zB, in which M$^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leq a \leq 1.25$, $0 \leq x \leq 1$, $10^{-6} \leq y \leq 2 \times 10^{-1}$, and $0 \leq z \leq 2 \times 10^{-1}$, respectively;

(Ba$_{1-x}$,M$^{II}$$_x$)F$_2$.aBaX$_2$:yEu,zA, in which M$^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 \leq z \leq 5 \times 10^{-1}$, respectively;

$M^{III}OX:xCe$, in which $M^{III}$ is at least one trivalent metal element selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 \leq x \leq 0.1$;

$Ba_{1-x}M_{x/2}L_{x/2}FX:yEu^{2+}$, in which M is at least one alkali metal element selected from the group consisting of Li, Na, K, Rb and Cs; L is at least one trivalent metal element selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 \leq y \leq 0.1$, respectively;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leq x \leq 0.1$ and $0 \leq y \leq 0.1$, respectively;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 \leq y \leq 0.1$, respectively;

$BaFX.xNaX':aEu^{2+}$, in which each of X and X' is at least one halogen selected from the group consisting of Cl, Br and I; and x and a are numbers satisfying the conditions of $0 \leq x \leq 2$ and $0 \leq a \leq 0.2$, respectively;

$M^{II}FX.xNaX':yEu^{2+}:zA$, in which $M^{II}$ is at least one alkaline earth metal element selected from the group consisting of Ba, Sr and Ca; each of X and X' is at least one halogen selected from the group consisting of Cl, Br and I; A is at least one transition metal element selected from the group consisting of V, Cr, Mn, Fe, Co and Ni; and x, y and z are numbers satisfying the conditions of $0 \leq x \leq 2$, $0 \leq y \leq 0.2$ and $0 \leq z \leq 10^{-2}$, respectively;

$M^{II}FX.aM^{I}X'.bM^{'II}X''_2.cm^{III}X'''_3.xA:yEu^{2+}$, in which $M^{II}$ is at least one alkaline earth metal element selected from the group consisting of Ba, Sr and Ca; $M^{I}$ is at least one alkali metal element selected from the group consisting of Li, Na, K, Rb and Cs; $M^{'II}$ is at least one divalent metal element selected from the group consisting of Be and Mg; $M^{III}$ is at least one trivalent metal element selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satisfying the conditions of $0 < x \leq 0.5$ and $0 < y \leq 0.2$, respectively;

$M^{II}X_2.aM^{II}X'_2:xEu^{2+}$, in which $M^{II}$ is at least one alkaline earth metal element selected from the group consisting of Ba, Sr and Ca; each of X and X' is at least one halogen selected from the group consisting of Cl, Br and I, and $X \neq X'$; and a and b are numbers satisfying the conditions of $0.1 \leq a \leq 10.0$ and $0 < x \leq 0.2$, respectively;

$M^{II}FX.aM^{I}X':xEu^{2+}$, in which $M^{II}$ is at least one alkaline earth metal element selected from the group consisting of Ba, Sr and Ca; $M^{I}$ is at least one alkali metal element selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 < a \leq 4.0$ and $0 < x \leq 0.2$, respectively; and $M^{I}X:xBi$, in which $M^{I}$ is at least one alkali metal element selected from the group consisting of Rb and Cs; X is at least one halogen selected from the group consisting of Cl, Br and I; and x is a number satisfying the condition of $0 < x \leq 0.2$.

The $M^{II}X_2.aM^{II}X'_2:xEu^{2+}$ phosphor may further contain the following additives for 1 mol of $M^{II}X_2.aM^{II}X'_2$:

$bM^{I}X''$, in which $M^{I}$ is at least one alkali metal element selected from the group consisting of Rb and Cs; X'' is at least one halogen selected from the group consisting of F, Cl, Br and I; and b is a number satisfying the condition of $0 < b \leq 10.0$;

$bKX''.cMgX'''_2.dM^{III}X''''_3$, in which $M^{III}$ is at least one trivalent metal element selected from the group consisting of Sc, Y, La, Gd and Lu; each of X'', X''', and X'''' is at least one halogen selected from the group consisting of F, Cl, Br and I; and b, c and d are numbers satisfying the conditions of $0 \leq b \leq 2.0$, $0 \leq c \leq 2.0$ and $0 \leq d \leq 2.0$, and $2 \times 10^{-5} \leq b+c+d$;

bA, in which A is at least one oxide selected from the group consisting of $SiO_2$ and $P_2O_5$; and b is a number satisfying the condition of $10^{-4} \leq b \leq 2 \times 10^{-1}$;

yB (boron), in which y is a number satisfying the condition of $2 \times 10^{-4} \leq b \leq 2 \times 10^{-1}$;

bSiO, in which b is a number satisfying the condition of $0 < b \leq 3 \times 10^{-2}$;

$bSnX''_2$, in which X'' is at least one halogen selected from the group consisting of F, Cl, Br and I; and b is a number satisfying the condition of $0 < b \leq 10^{-3}$;

$bCsX''.cSnX'''_2$, in which each of X'' and X''' is at least one halogen selected from the group consisting of F, Cl, Br and I; and b and c are numbers satisfying the conditions of $0 < b \leq 10.0$ and $10^{-6} \leq c \leq 2 \times 10^{-2}$, respectively; and $bCsX''.yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0 < b \leq 10.0$ and $10^{-6} \leq y \leq 1.8 \times 10^{-1}$, respectively.

Among the above-described stimulable phosphors, the divalent europium activated alkaline earth metal halide phosphor is particularly preferred, because the phosphor shows stimulated emission of high luminance. The above-described stimulable phosphors are by no means given to restrict the stimulable phosphor employable in the present invention, and any other phosphors can be also employed, provided that the phosphor gives stimulated emission when excited with stimulating rays after exposure to a radiation.

As the phosphor layer of the radiation image storage panel of the invention, there can be employed a phosphor layer comprising a binder and a stimulable phosphor dispersed therein or a phosphor layer composed of only an agglomerate of a stimulable phosphor not containing a binder. There can be also employed other type of a phosphor layer in which voids of a stimulable phosphor agglomerate are impregnated with a polymer material.

In the case of the phosphor layer containing the ultraviolet light absorbing agent, the ultraviolet light absorbing agent can be incorporated thereinto in the form of a mixture with a binder or a polymer material, or using a binder or a polymer material which per se becomes an ultraviolet light absorbing agent, so that naturally the phosphor layer of the invention is a phosphor layer comprising a binder and a stimulable phosphor dispersed therein or a phosphor layer in which voids of a stimulable phosphor agglomerate are impregnated with a polymer material.

However, even the phosphor layer composed of only an agglomerate of a stimulable phosphor not containing a binder or a polymer material can also contain the ultraviolet light absorbing agent by dipping the phosphor layer in a solution of an ultraviolet light absorbing agent, or coating the solution over the phosphor layer, and then evaporating the solvent from the phosphor layer to keep the ultraviolet light absorbing agent in the phosphor layer in the deposited form on the agglomerate of the stimulable phosphor.

The ultraviolet light absorbing agent has a high absorption band within the ultraviolet wavelength region. Even when the ultraviolet light absorbing agent absorbs ultraviolet rays, it does not show any phenomenon of photo-decomposition, photosensityzing reaction, fluorescence or phosphorescence, but converts the energy of the ultraviolet rays into thermal energy to release the energy outside. Since the ultraviolet light absorbing agent itself never change in this stage, any adverse influence is given the environment by the agent. Moreover, the ultraviolet light absorbing agent per se is never consumed.

Examples of the ultraviolet light absorbing agents employable in the invention include salicylates, benzophenone derivatives, benzotriazole derivatives, hydroxybenzoate derivatives, cyanoacrylate derivatives, aryl ester derivatives, oxanilide derivatives and formamidine derivatives.

Concrete examples of the ultraviolet light absorbing agents include phenyl salicylate, 2.hydroxyphenyl benzo-triazole, 2-(2'-hydroxy.5'- methylphenyl)benzotriazole, 2'-hydroxy-3'-t-butyl-5'-methylphenyl)-5-chlorobenzotriazole, 2-(2'-hydroxy-3',5'-di-t-butylphenyl) benzotriazole, 2-(2'-hydroxy-5'-t-octylphenyl)benzotriazole, 2-(2'-hydroxy.3', 5'-di-t-amylphenyl)benzotriazole, 2-hydroxybenzophenone, 2-hydroxy-4-methoxybenzophenone, 2-hydroxy-4-octoxybenzophenone, 2,2'-dihydroxy-4-methoxybenszophenone, p-t-butylphenyl salicylate, 2,4'-dihydroxybenzophenone, benzophenone double compound (e.g., Viosorb 180.A, trade name of Kyodo Yakuhin co., Ltd.), 2,4-di-t-butylphenyl.3',5'-di-butyl-4'-hydroxy-benzoate, ethyl-2-cyano-3,3'-di-phenylacrylate. 2-{2'-hydroxy-3'-(3'',4'',5'',6''-tetrahydrophthalimidemethyl)-5'-methylphenyl}-benzotriazole, {2,2'-thiobis(4-t-octyl-phenylate) }-n-butylamine nickel and dimethyl-p-methoxybenzilidinemalonate.

A process for the preparation of the radiation image storage panel of the invention is described below exemplifying a radiation image storage panel comprising a support and a phosphor layer provided thereon which comprises a binder and a stimulable phosphor dispersed therein.

The phosphor layer can be provided on the support, for example, by the following process.

In the first place, the above-described stimulable phosphor and a binder are added to an appropriate solvent, and they are well mixed to prepare a coating dispersion for the formation of a phosphor layer in which the stimulable phosphor particles are homogeneously dispersed in a binder solution.

In the case of preparing a radiation image storage panel whose phosphor layer contains the ultraviolet light absorbing agent, the ultraviolet light absorbing agent is added to the coating dispersion. The ultraviolet light absorbing agent is added to the coating dispersion in such a manner that the amount of the ultraviolet absorbing agent contained in the resulting phosphor layer would be preferably 0.005 to 1 mg per 1 $cm_2$. The amount of the ultra-violet light absorbing agent employable in the invention depends on the ratio between the phosphor and the binder and the thickness of the phosphor layer, but the amount thereof generally is 0.06 to 13 mg for 1 g of the employed phosphor. Further, the ultraviolet light absorbing agent contained in the phosphor layer preferably absorbs ultra-violet rays having a wavelength of not longer than 350 nm in an amount of 50 % or more.

Examples of the binders include: natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate.

Examples of the solvents employable in the preparation of the dispersion include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether and ethylene glycol monomethyl ether; and mixtures of the above-mentioned compounds.

A ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder : phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate, and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

In the case of using a phosphor containing iodine as the stimulable phosphor, the coating dispersion may further contain an anti-yellowing agent to prevent the resulting phosphor layer from yellowing caused by formation of iodine molecule ($I_2$). Examples of the anti yellowing agent include compounds containing epoxy group, phosphorous acid esters, organic tin compounds and organic acid metal salts, as described in U.S. patent application Ser. No. 039 691 now U.S. Pat. No. 4,900,641 .

The coating dispersion containing the phosphor particles and the binder prepared as above is applied evenly to the surface of a support to form a layer of the coating dispersion. The coating procedure can be carried out by a conventional method such as a method of using a doctor blade, a roll coater or a knife coater.

A support material employable in the invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ceramic sheets such as sheets of alumina, zirconia, magnesia and titania; ordinary papers; baryta paper; resin-coated papers; pigment papers containing titanium dioxide or the like; and papers sized with polyvinyl alcohol or the like.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provide thereby. For example, a subbing layer or an adhesive layer may be provided by coating a polymer material such as gelatin over the surface of the support on the phosphor layer side. Otherwise, a light-reflecting layer or a light-absorbing layer may be provide by forming a polymer material layer containing a light-reflecting material such as titanium dioxide or a light-absorbing material such as carbon black. In the invention, one or more of these additional layers may be provided on the support, and the constitution thereof can be optionally selected depending upon the purpose of the radiation image storage panel.

As described in U.S. patent application Ser. No. 496,278 now U.S. Pat. No. 4,575,635, the phosphor layer-side surface of the support (or the surface of an adhesive layer, light-reflecting layer, or light-absorbing layer in the case that such layers are provided on the phosphor layer) may be provided with protruded and depressed portions for enhancement of the sharpness of a radiation image.

The coating dispersion is coated over the support as described above. Then the coated layer of the dispersion is dried to complete the formation of a phosphor layer on the support. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 μm to 1 mm, preferably from 50 to 500 μm.

The phosphor layer can be provided on the support by the methods other than that given in the above. For example, the phosphor layer is initially prepared on a sheet (false support) such as a glass plate, metal plate or plastic sheet using the aforementioned coating dispersion and thus prepared phosphor layer is then overlaid on the genuine support by pressing or using an adhesive agent.

The protective film of the radiation image storage panel of the invention will be described below.

The protective film can be provided on the phosphor layer by evenly coating the surface of the phosphor layer using a doctor blade or the like with a solution prepared by dissolving an organic polymer material such as a cellulose derivative or polymethyl methacrylate in an appropriate solvent, and drying the coated solution. Alternatively, the protective film can be provided on the phosphor layer by beforehand preparing a film for forming a protective film from a plastic sheet made of polyethylene terephthalate, etc. or a transparent glass sheet, followed by placing and fixing it onto the phosphor layer with an appropriate adhesive agent. Otherwise, the protective film can be also provided by depositing an inorganic compound.

In the radiation image storage panel of the invention, any of the protective films prepared by the above-mentioned methods can be provided on the phosphor layer containing the ultraviolet light absorbing agent.

In the case that the protective film is formed by coating a coating solution for the formation of a protective film on the surface of the phosphor layer, the above-mentioned ultraviolet light absorbing agent is incorporated into the coating solution so as to prepare a radiation image storage panel of the invention having a protective film which contains an ultraviolet light absorbing agent. The coating solution for the formation of a protective film may contain a crosslinking agent other than organic polymer materials such as a cellulose derivative, polymethyl methacrylate and a polyurethane resin, so as to crosslink those polymer materials. In the case of using a phosphor containing iodine as the stimulable phosphor of the phosphor layer, the coating solution for the formation of a protective film may further contain an anti-yellowing agent as well as in the coating dispersion for the formation of a phosphor layer.

Coating of the solution for the formation of a protective film over the phosphor layer can be carried out in the similar manner to that for the phosphor layer. Alternatively, coating of the solution for the formation of a protective film and coating of the dispersion for the formation of a phosphor layer can be made simultaneously with each other through simultaneous superposition coating using, for example, a double-hopper coating machine, as described in U.S. Pat. No. 4,728,583.

The coating solution for the formation of a protective film is coated on the surface of the phosphor layer as described above, and the coated solution is then heated to dryness so as to form a protective film on the phosphor layer.

In the case that the protective film is prepared by bonding a previously-prepared sheet for the formation of a protective film (protective film-forming sheet) to the surface of the phosphor layer via an adhesive layer, the radiation image storage panel of the invention having a protective film which contains an ultraviolet light absorbing agent can be prepared by adding the above-mentioned ultraviolet absorbing agent to the materials of a protective film-forming sheet to prepare a protective film-forming sheet containing an ultraviolet light absorbing agent and bonding the sheet by means of an adhesive layer placed between the phosphor layer and the protective film.

The adhesive layer can be provided on the phosphor layer by coating a solution for the formation of an adhesive layer which contains a binder, a solvent, etc. employable for the aforementioned coating dispersion for the formation of a phosphor layer. By incorporating the above-mentioned ultraviolet light absorbing agent into the coating solution for the formation of an adhesive layer, the radiation image storage panel of the invention having an adhesive layer which contains an ultraviolet light absorbing agent can be obtained.

In any of the case that the protective film contains an ultraviolet light absorbing agent and the case that the adhesive layer contains an ultraviolet light absorbing agent, the amount of the ultraviolet light absorbing agent contained in the protective film or the adhesive layer preferably is in the range of 0.005 to 1 mg/cm$^2$, for fully accomplishing the object of the present invention. Further, in any of those cases, the ultraviolet light absorbing agent contained therein preferably absorbs ultraviolet rays having a wavelength of not longer than 350 nm in an amount of 50 % or more. For the purpose of enhancing the sharpness of the obtained image, at least any one of the above-mentioned film and layers constituting the radiation image storage panel of the invention may be colored with such a colorant as absorbs only stimulating rays and not absorbs stimulated emission, as described in Japanese Patent Publication No. 0 59(1984) -23400.

The examples of the present invention and the comparison examples are given below, but the examples are construed by no means to restrict the invention.

EXAMPLE 1

As materials of a phosphor layer, 600 g of a phosphor (BaFBr$_{0.8}$I$_{0.2}$:0.001Eu$z^{2+}$), 15.8 g of a polyurethan resin (binder, Desmolac 4125 of Sumitomo Bayer Urethane Co., Ltd.), 2.0 g of an epoxy resin of bisphenol A type and 0.2 g of alkyl diaryl phosphite (anti-yellowing agent) were added to a mixture solvent of methyl ethyl ketone and toluene (methyl ethyl ketone : toluene = 1 : 1), and they were mixed using a propeller mixer to prepare a coating dispersion for the formation of a phosphor layer having a viscosity of 25 to 30 PS.

Independently, as materials of a protective film, 6.9 g of a polyurethane resin (Desmolac 4200 of Sumitomo Bayer Urethane Co., Ltd.), 2.0 g of nitrocellulose, 1.0 g of isocyanate (crosslinking agent, Desmodule Z4370 of Sumitomo Bayer Urethane Co., Ltd.) and 0.1 g of alkyl diaryl phosphite (anti-yellowing agent) were added to a mixture solvent of toluene and isopropyl alcohol (toluene : isopropyl alcohol = 1:1). To the resulting solution was further added p-t-butylphenyl salicylate (ultraviolet light absorbing agent, Viosorb 90 of Kyodo Yakuhin Co., Ltd.), and they were mixed to prepare a coating solution for the formation of a protective film having a viscosity of 2 to 3 PS.

The coating dispersion for the formation of a phosphor layer and the coating solution for the formation of a protective film prepared as above were coated simultaneously on a support using a coating machine of double hopper type, and the coated layers of the dispersion and the solution were heated and cured to dryness at 100 ° C. for 15 minutes, to prepare a radiation image storage panel of the present invention having a protective film of 10 μm thick and a phosphor layer of 250 μm.

COMPARISON EXAMPLE 1

The procedures of Example 1 were repeated except for not incorporating the ultraviolet light absorbing agent into the solution for the formation of a protective film, to prepare a radiation image storage panel.

Evaluation of Radiation Image Storage Panel

The radiation image storage panels obtained in Example 1 and Comparison Example 1 were evaluated on the tendency of fogging caused by ultraviolet rays according to the following test.

Each of the radiation image storage panels was beforehand irradiated with light of a high-pressure sodium lamp through an ultraviolet rays-removing filter to order to erase fog completely. Each of the panels was allowed to stand for 1 hour in a place where light of 100 lux of a fluorescent lamp is irradiated, and then stimulated with a He-Ne laser (632.8 nm) to measure the amount of stimulated emission given by fog caused by ultraviolet rays contained in the light of the fluorescent lamp.

The results are set forth in Table 1.

TABLE 1

|  | Example 1 | Com. Ex. 1 |
| --- | --- | --- |
| Relative Amount of Stimulated Emission | 20 | 1,000 |

As is evident from the results set forth in Table 1, the radiation image storage panel of Example 1 whose protective film contained an ultraviolet light absorbing agent showed fog of prominently lower level caused by ultraviolet rays, as compared with the radiation image storage panel of Comparison Example 1.

EXAMPLE 2

As materials of an adhesive layer, 1.9 g of an unsaturated polyester resin and 0.1 g of an epoxy resin of bisphenol A type were dissolved in 98 g of methyl ethyl ketone, and to the resulting solution was further added 0.06 g of p-t-butylphenyl salicylate (ultraviolet light absorbing agent, Viosorb 90 of Kyodo Yakuhin Co., Ltd.) to prepare a coating solution for the formation of an adhesive layer. The coating solution was coated over a transparent polyethylene terephthalate film (thickness: 10 μm) using a doctor blade, and the coated solution was dried to form an adhesive layer having a thickness of 1.5 μm on transparent polyethylene terephthalate film. The transparent film with the adhesive layer was placed on a phosphor layer having been beforehand prepared using the coating dispersion for the formation of a phosphor layer of Example 1 in such a manner that the adhesive layer faced the phosphor layer, and they were bonded to each other to provide a protective film of the transparent polyethylene terephthalate film (thickness: 10 μm) on the phosphor layer through the adhesive layer.

Thus, a radiation image storage panel of the invention whose adhesive layer contained an ultraviolet light absorbing agent.

COMPARISON EXAMPLE 2

The procedures of Example 2 were repeated except for not incorporating the ultraviolet light absorbing agent into the coating solution for the formation of an adhesive layer, to prepare a radiation image storage panel.

Evaluation of Radiation Image Storage Panel

The radiation image storage panels obtained in Example 2 and Comparison Example 2 were evaluated on the tendency of fogging caused by ultraviolet rays in the same test as described before.

The results are set forth in Table 2.

TABLE 2

|  | Example 2 | Com. Ex. 2 |
| --- | --- | --- |
| Relative Amount of Stimulated Emission | 40 | 1,000 |

As is evident from the results set forth in Table 2, the radiation image storage panel of Example 2 whose adhesive layer contained an ultraviolet light absorbing agent showed fog of prominently lower level caused by ultraviolet rays, as compared with the radiation image storage panel of Comparison Example 2.

EXAMPLE 3

As materials of a phosphor layer, 600 g of a phosphor ($BaFBR_{0.8}I_{0.2}:0.001Eu^{2+}$), 3.2 g of a polyacrylic resin (binder, Dinal BR102 of Mitsubishi Chemical Industries., Ltd.), 0.4 g of nitrocellulose and 0.4 g of an epoxy resin of bisphenol A type were added to a mixture solvent of methyl ethyl ketone and toluene (methyl ethyl ketone: tolene=1:1). To the resulting dispersion was further added 0.6 of ethyl-2-cyclo-3,3-di-phenylacrylate (ultraviolet light abosrbing agent, Viosorb 910 of Kyodo Yakuhin Co., Ltd.), and they were mixed using a propeller mixer to prepare a coating dispersion for the formation of a phosphor layer having a viscosity of 25 to 30 PS. The coating dispersion was coated on a support, and the coated dispersion was dried to obtain a phosphor layer containing an ultraviolet light absorbing agent. On the phosphor layer was provided a protective film in the same manner as described in Comparison Example 2, to prepare a radiation image storage panel of the invention whose phosphor layer contained an ultraviolet light absorbing agent.

COMPARISON EXAMPLE 3

The procedures of Example 3 were repeated except for not incorporating the ultraviolet light absorbing agent into the coating dispersion for the formation of a phosphor layer, to prepare a radiation image storage panel.

Evaluation of Radiation Image Storage Panel

The radiation image storage panels obtained in Example 3 and Comparison Example 3 were evaluated on the tendency of fogging caused by ultraviolet rays in the same test as described before.

The results are set forth in Table 3.

TABLE 3

|  | Example 3 | Com. Ex. 3 |
| --- | --- | --- |
| Relative Amount of Stimulated Emission | 100 | 1,000 |

As is evident from the results set forth in Table 3, the radiation image storage panel of Example 3 whose phosphor layer contained an ultraviolet light absorbing agent showed fog of prominently lower level caused by ultraviolet rays, as compared with the radiation image storage panel of Comparison Example 3.

It was confirmed from the examples of the invention that the radiation image storage panels of the invention hardly brought about fogging caused by ultraviolet rays.

I claim:

1. A radiation image storage panel having a phosphor layer comprising a stimulable phosphor and a protective film provided on the phosphor layer via an adhesive layer, wherein at least one of the protective film, the adhesive layer and the phosphor layer contains an ultraviolet light absorbing agent.

2. The radiation image storage panel as claimed in claim 1, wherein the amount of the ultraviolet light absorbing agent contained in at least one of the protective film, the adhesive layer and the phosphor layer is within the range of 0.005 mg to 1 mg per 1 $cm^2$.

3. The radiation image storage panel as claimed in claim 1, wherein the ultraviolet light absorbing agent contained in at least one of the protective film, the adhesive layer and the phosphor layer absorbs ultraviolet rays having a wavelength of not longer than 350 nm in an amount of not less than 50%.

4. The radiation image storage panel as claimed in claim 1, wherein the ultraviolet light absorbing agent is selected from the group of ultraviolet light absorbing materials consisting of salicylates, benzophenone derivatives, benzotriazoic derivatives, hydroxbenzoate derivatives, cyanoacrylate derivatives, aryl ester derivatives, oxanilide derivatives and formamidine derivatives.

5. A radiation image storage panel having phosphor layer comprising a stimulable phosphor and a protective film, wherein at least one of the protective film and the phosphor layer contains an ultraviolet light absorbing agent.

6. The radiation image storage panel as claimed in claim 5, wherein the amount of the ultraviolet light absorbing agent contained in at least one of the protective film and the phosphor layer is within the range of 0.0005 mg to 1 mg per 1 $cm^2$.

7. The radiation image storage panel as claimed in claim 5, wherein the ultraviolet light absorbing agent contained in at least one of the protective film and the phosphor layer absorbs ultraviolet rays having a wavelength of not longer than 350 nm in an amount of not less than 50%.

8. The radiation image storage panel as claimed in claim 5, wherein the ultraviolet light absorbing agent is selected from the group of ultraviolet light absorbing materials consisting of salicylates, benzophenone derivatives, benzotriazoic derivatives, hydroxybenzoate derivatives, cyanoacrylate derivatives, aryl ester derivatives, oxanilide derivatives and formamidine derivatives.

* * * * *